July 31, 1962 R. E. YOUNG 3,047,191
FILAMENT WOUND VESSELS AND METHODS FOR FORMING SAME
Filed Nov. 26, 1957 2 Sheets-Sheet 1
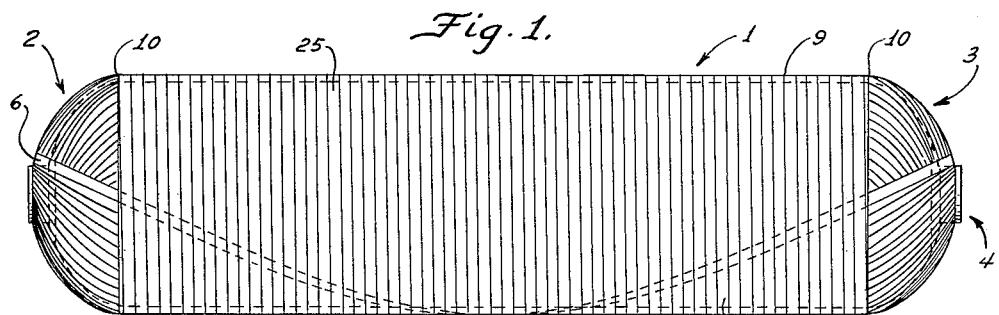
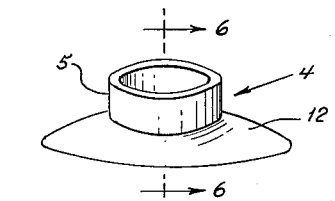
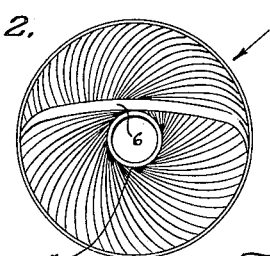
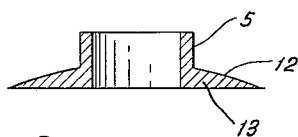
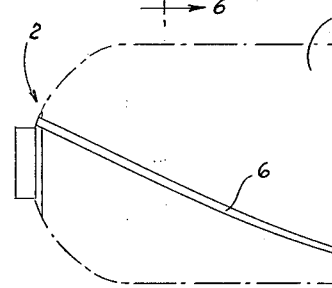
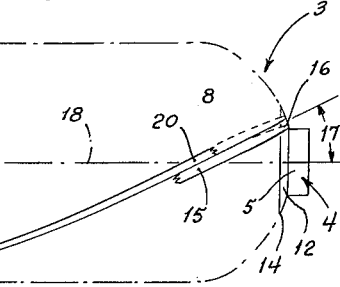
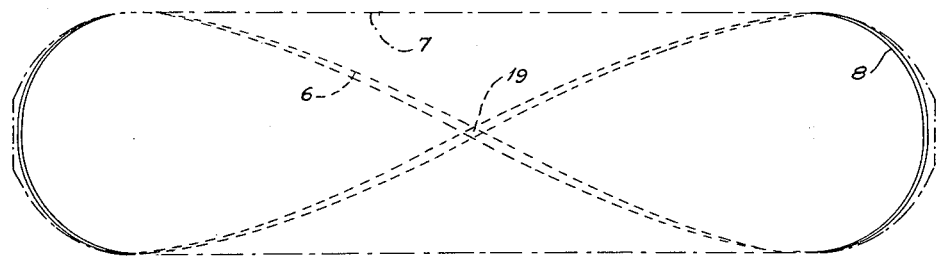
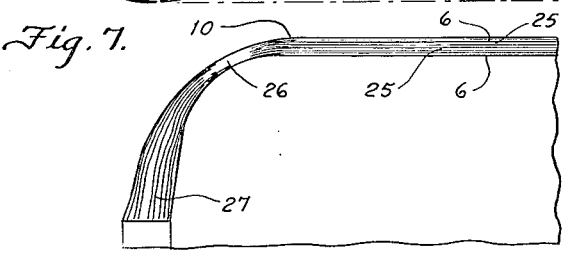
RICHARD E. YOUNG
INVENTOR.
BY
ATTORNEY.

July 31, 1962 R. E. YOUNG 3,047,191
FILAMENT WOUND VESSELS AND METHODS FOR FORMING SAME
Filed Nov. 26, 1957 2 Sheets-Sheet 2

RICHARD E. YOUNG
*INVENTOR.*

BY

*Clinton S. Miller*
ATTORNEY

United States Patent Office 3,047,191
Patented July 31, 1962

3,047,191
FILAMENT WOUND VESSELS AND METHODS
FOR FORMING SAME
Richard E. Young, Rocky Hill, N.J., assignor, by mesne
assignments, to Hercules Powder Company, Wilmington, Del., a corporation of Delaware
Filed Nov. 26, 1957, Ser. No. 699,077
18 Claims. (Cl. 220—83)

This invention relates to filament wound vessels and methods for forming the same and is particularly concerned with such vessels including integral ends and having uniform strength throughout. Though the invention will principally be described as embodied in pressure vessels of rigid construction, it is to be noted that the teachings are also applicable to resilient walled vessels. Illustrations of the latter are aircraft tires and the roller type members employed for supporting vehicles such as those commonly known as "marsh buggies."

In my co-pending application Serial No. 374,600, filed August 17, 1953, for Filament Wound Hollow Elements and Methods for Making Same, now Patent #2,843,153, granted July 15, 1958, I have disclosed and claimed filament wound hollow elements and methods for making the same. That application is concerned with the formation of open ended elements such as pipes and conduits. It does, however, disclose the basic helical filament winding pattern generally of the type embodied in the instant invention.

There is presently a very considerable demand for pressure vessels for containing fluids under relatively high pressure of a high strength to weight ratio and of high resistance against deterioration from all sources. The formation of vessels by the intermeshed helical winding of high strength filament material with a suitable resin binder lends itself admirably to the solution of this problem. For proper effectiveness, however, such vessels need to have uniform strength throughout, or, more specifically, uniform resistance to the action of internal pressure, regardless of the direction of application thereof. How to accomplish this has not heretofore been determined while embracing all of the required desiderata. Among these desiderata is the provision of vessels of a variety of sizes and shapes while maintaining their strength uniform throughout. Another is the provision of a polar plug fitting of minimum size for the ends of the vessel. Another is the ability of the vessel to enclose a maximum volume while keeping the vessel size down to a minimum. Another has been to provide a simple and effective method for the forming of such vessels.

Still another is to provide for the generation of the proper end shape to withstand external axial end loads in combination with resistance to internal pressure.

It is, accordingly, an object of the invention to provide filament wound pressure vessels with integral ends formed for uniform fiber stress while yielding maximum strength to weight ratio.

Another object is to provide such vessels accommodating polar plugs, or end fittings of minimum size.

Still another object is to provide such vessels with end shapes of high strength and of maximum internal volume.

Still another object is to provide for the formation of such vessels with end shapes capable of withstanding axial external end loads as well as internal pressure.

A further object is to provide methods for the formation of such vessels in simple and economical manner.

A still further object is to provide such methods which can be carried out by simple equipment simultaneously depositing the various windings required.

Further and more detailed objects will in part be obvious and in part be pointed out as the description of the invention taken in conjunction with the accompanying drawings proceeds.

In the drawings, wherein reference symbols refer to like parts wherever they occur:

FIG. 1 is a side elevation of a vessel in accordance with the invention;

FIG. 2 is an end elevation thereof;

FIG. 3 is a front elevation of a helical circuit winding on which the construction of the vessel is based showing the same as applied to a suitable mandrel;

FIG. 4 is a top plan view of the same;

FIG. 5 is a perspective view of one illustrative form of end fitting;

FIG. 6 is a section thereof taken on line 6—6 of FIG. 5;

FIG. 7 is a fragmentary radial section of a portion of a vessel in accordance with the invention taken through one end and a portion of a joining body.

Figure 8:
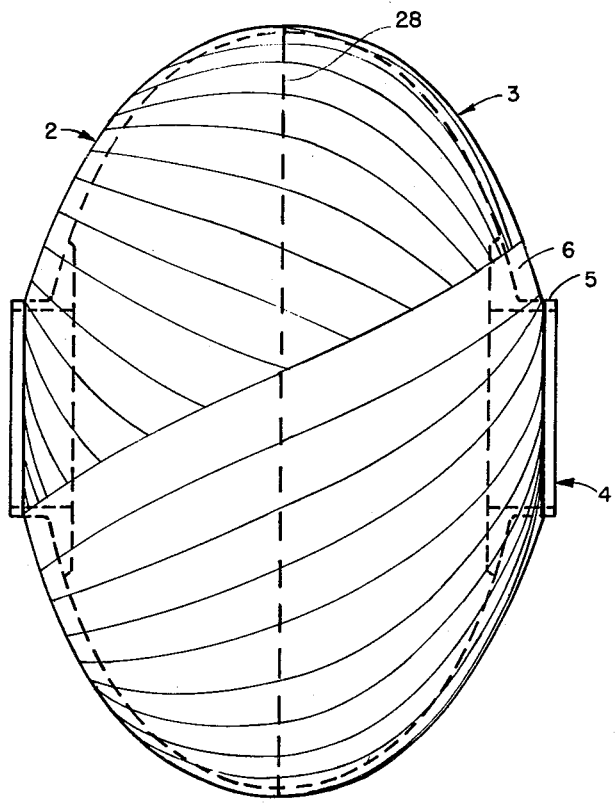
FIG. 8 is a side elevation of a vessel in accordance with the invention wherein the cylindrical body is omitted, and the vessel is made up of a pair of substantially identical ovaloid ends.

The vessel of the invention can generally be considered as being formed of windings of fibrous material in conjunction with sufficient settable binder to bind together the fibers of each layer as well as those of various superposed layers of windings and to fill any interstices that may exist between any of those windings or layers. Thus the structure is primarily one of fibrous material with the quantity of settable binder being kept to a minimum, rather than a structure involving merely the reinforcement of a resinous body by the use of fibers. Therein lies the strength of the vessel with minimum weight and maximum resistance to deterioration.

As regards the fibers, glass is the presently preferred material for them when the structure is to be a rigid one. The invention is not, however, so limited, as other fibrous materials having preferable characteristics for any particular use may be employed in place of glass. For a flexible construction, flexible or rubber like materials are needed.

As regards the settable binder, though the epoxy resins are the presently preferred material, again, this is by way of illustration and not limitation. The selection of the particular resin or plastic depends on such things as the desired characteristics, the price and workability. Again, a flexible resin is needed for a flexible construction.

With respect to terminology, though the vessel will be generally referred to as "formed of filament wound material" that is by no means limiting to filamentary material as commonly envisaged. Elements in accordance with the invention are considered as being filamentary whether of the commonly considered circular cross-sectional form or of a flat ribbon like formation. In this flat formation they also may fall into the category of what normally may be considered as a band. As contemplated in the application, however, bands, besides being individual elements of ribbon like form, may be composed of elements formed of a plurality of filaments laid side by side. Thus the windings forming the principal structure of the vessel of the invention may be of anything from individual filaments of fibrous material in their commonly accepted circular cross sectional form, to bands of ribbon like form, whether such bands be single integral members or be made up of a plurality of filaments.

For illustrative purposes, the vessel of the invention is shown as being formed with a cylindrical body 1 and ovaloid ends 2 and 3. In certain instances, however, as pointed out hereinafter, the cylinder body may be omitted, with the vessel being made up of what would otherwise be considered as a pair of ovaloid ends. These ends are identical, so only one need be described. The ends are each equipped with an end fitting 4 providing a suitably sized opening 5 therethrough.

The provision of ovaloid ends and the formation of the same by the portions of the windings resulting from the reversing of the basic helical winding for the body of the cylinder enables a vessel to be formed of uniform strength throughout, so long as the proper ovaloid formation of the ends is maintained and providing that is properly related to the diameter of the body. This formation, or shape, of the ends results from a computing method and device used for the determination of the proper mandrel shape. Such method and device are described and claimed in my co-pending application entitled, Device and Method for Determining the End Pattern of Filament Wound Pressure Vessel, Serial #699,078 filed November 26, 1957, now U.S. Letters Patent No. 3,005,256. As set forth in said copending application, it has been discovered that the contour of ovaloid ends for a vessel of the type under consideration can be determined so as to provide uniform strength of the end throughout its curvature, or, in other words, to form the wound structure of the ends so as to be in complete balance. To do this, the tension load in each filament must be constant for every location in the end structure though the stress due to internal pressure will vary in relation to the curvature at the end.

Method disclosed and claimed in the said copending application involves the simulation of the end pattern for the desired structure by employing a frame simulating a circular cross section of a body of a vessel with an end fitting suitably mounted in predetermined position as part of that frame and the development of a netting structure by applying windings over the frame and about the end fitting. The netting must be laced on by hand under such tension as readily becomes apparent to the user of the device.

When the netting structure is completed, the support for the end fitting is removed and the netting structure is loaded from within by the inflating of an air-tight membrane and adjustment of the tension on the netting to bring the surface contour to the precise shape required for constant fiber stress and maximum structural efficiency. Important in this is the adjusting of the structure until the radial section of the curved surface generated has a terminal slope which brings it tangent to the simulated cylindrical body.

Not only does this method enable the end formation to be determined for uniform resistance to internal pressure, but it also serves for examination of the effect of external forces. This is achieved by applying a force to the end fitting which is in proper proportion to the inflation pressure. This will show the effect of the force on the surface profile slope and profile adjustment can be made if needed by adjusting the netting tension.

When the proper end contour has been attained, shadowgraphs of it may be formed on a flat surface and by rotating the device the different profile projected may be averaged out graphically to give the proper mean curvature.

Once the desired profile is determined, it may be adjusted to size by the use of some means, such as a pantograph, and may be corrected for such things as wall fittings and thickness to be used. A mandrel for use in forming the vessel by helical windings, as taught in my application Serial No. 374,600, filed August 17, 1953 for Filament Wound Hollow Elements and Methods for Making Same, is made up with ends contoured in accordance with the end pattern determined.

The ovaloid end elements of centrally axial filament wound pressure vessels of this invention have an interior surface shaped substantially the same as the shape of an ovaloid end pattern for a filament wound pressure vessel determined in accordance with method of the above said copending application Ser. No. 699,078, which in one embodiment comprises establishing the circle of maximum circumference of the end pattern in a plane with the central axis passing through the center of said circle and at right angles to said plane, establishing a position on said axis in spaced relation with respect to said plane, which position is approximately the position of the closing end of said end pattern on said axis, establishing a relatively smaller circle than said circle of maximum circumference having its center at about said approximate closing end position and lying in a plane perpendicular to said axis, passing thread under substantially uniform tension between said circle of maximum circumference and said relatively smaller circle to form a network of thread therebetween, and expanding with uniform pressure said network outwardly from the inner side thereof to form an end curvature wherein all the threads are in uniform tension, and, when necessary, adjusting the resulting structure until the curves defined by axially sectioning the end curvatures so formed have terminal slopes which bring them tangent to a simulated cylinder formed by moving said circle of maximum circumference along said central axis.

Still in accordance with another embodiment of the said copending application 699,078, the ovaloid end elements of centrally axial filament wound pressure vessels of this invention have an interior surface shaped substantially the same as the shape of an ovaloid end pattern for a filament wound pressure vessel determined by establishing the circle of maximum circumference of the end pattern in a plane with the central axis passing through the center of said circle and at right angles to said plane, establishing a position on said axis in spaced relation with respect to said plane, which position is approximately the position of the closing end of said end pattern on said axis, seating in upright position with respect to said plane a fitting having a cylindrical neck and a flanged base, said fitting being seated coaxially with said central axis and having its flanged base substantially at said approximate closing end position, passing threads from positions on said circle across said flanged base tangent to said cylindrical neck to form a network of threads therebetween, securing said threads at said circle, removing the support for said fitting, and expanding with uniform pressure said network outwardly from the inner side thereof to form an end curvature wherein all the threads are in uniform tension.

As far as the ends are concerned, a complete end shaped integrally with a helically wound cylindrical body may be generated from a single system of constant helix angle. The angle of this helix, illustrated by the winding 6 in FIGS. 1–4, must normally be small, since the end fitting 4 is normally small. When, however, a mandrel, such as 11, illustrated in dot-dash lines in FIGS. 3 and 4, is formed with ends 8 contoured as shown in those figures, by following the principles set out in my aforesaid application entitled Device and Method for Determining the End Patterns of Filament Wound Pressure Vessels, the end formations, resulting from the helical winding alone, have the uniform strength desired. Furthermore, the joining of the end formations, 2 and 3, to the body portion at 10 is also correct, so long as the curvature of the mandrel end 8, and consequently of the vessel ends wound thereon, comes tangent to the cylinder of the body portion of the mandrel 7 where the ends and body join at 10.

The fact that the helix angle is small, leaves a strength deficiency in the girth direction of the cylindrical portion of the vessel. This, however, may be readily corrected for by the addition of circular windings, or windings at only a small helix angle with respect to a plane extending radially of the axis of the cylinder. These windings hereinafter referred to as "girth windings" are preferably interspersed between the layers formed by the helical windings and are of the number calculated to make up for the girth strength deficiency for the particular vessel design.

The first step in the forming of the vessel of the invention is, of course, to provide a suitable mandrel on which to apply the winding. This mandrel, shaped in accordance with the foregoing principles, is normally made of disposable material so that it can be removed through the end fittings once the vessel is completed. In some instances, however, it may be made of material intended to remain within the vessel as a liner therefor. In either event, the end fittings 4 are positioned on the mandrel at the ends of the vessel axis before the winding starts, since the helical windings are applied over the flanges of the end fittings.

The upper surface 12 of the end fitting flange 13 need not be contoured in continuation of the mandrel end surface 8. It is sufficient if the surface 12 is that of a flat cone which comes tangent to the surface 8 at the point 14 where the surfaces meet.

In commencing the application of the windings to the mandrel 11, the upper surface 12 of the end fitting is primed with a resin so that the material of the winding will adhere thereto. Then, assuming that the winding is commenced adjacent the position as shown at 15 in FIG. 3, it is applied by moving the applying carriage to the right as the mandrel is turned until the winding overlies the surface 12 of the end fitting at the position 16 and tangent to the neck 5 of that fitting. Then the travel of the carriage is reversed and the winding 6, still at the helix angle 17 with respect to the axis 18 of the mandrel, travels across the far side of the mandrel, across the conical surface 12 of the end fitting at the other end 2 of the mandrel, again tangent to the neck 5 of that fitting, and, after crossing its outgoing portion at the position 19, as shown in FIG. 4, returns to a position adjacent the starting point. By suitably relating the speed of the applying head to that of the mandrel, however, the helix when it returns to the starting point, does so at a position where it lies alongside of its starting portion. Thus, when a complete circuit has been made, as indicated by the points 15 and 20 lying alongside of each other, the helical winding has made one complete circuit and is ready to lay down the next circuit from a position lying alongside of the commencement of the first circuit. This next circuit, as in case of the first one and all subsequent ones, provides again for the winding passing across the flange 12 of the end fitting 4 tangent to the outside of the cylindrical neck 5 thereof.

As the winding continues with one circuit after another being laid down alongside of the previous one, the whole of the mandrel is eventually covered with a complete layer of the material being wound. Along with the fibrous material of the winding, whether in filament or band form, the controlled quantity of suitable settable resin material is applied as more fully set forth in applicant's co-pending application, Serial No. 374,600 above referred to.

Applications of girth windings such as 25 to the cylindrical body portion of the vessel are dependent upon the girth strength requirements of the particular vessel. This is also related to the shape and size of the vessel and, accordingly, to the helical winding 6, for obviously a cylindrical wall formed of windings such as 6 at a small helix angle with respect to the axis of the vessel will not provide great girth strength. Thus the girth windings can commence as soon as the first layer formed of helical windings is completed and be laid between the first and second of these layers, or can, if needed, be applied in several layers between each of the helically wound layers. Contrariwise, several helically wound layers can be laid down before any girth winding was applied and then several further helically wound layers can be laid down before the next girth winding is commenced. In the construction of the present illustrative embodiment of the invention, however, a completed pattern of a girth winding extending from one end to the other of a cylindrical body portion of a vessel is shown as applied between each complete helically wound pattern or layer. The layers so formed are represented in the FIG. 7 showing by the reference characters 6 for the longitudinal helical one and 25 for the girth one.

Another important aspect of the FIG. 7 showing is that as the girth windings terminate at the position 10 where the ovaloid end pattern departs from the cylindrical body portion at a tangent thereto, the thinnest part of the vessel wall commences. Actually this thinnest part is reached at the position 26 just outwardly from the position 10. The wall strength, however, at the position 26, for all requirements of the vessel, both internal pressure and external load is adequate due to the curvature and the close compacting of the helical windings. Obviously, the wall at the portion 27 bordering the end fitting is the thickest due to the crossing over of the windings at this position and the massing of them over the surface 12 of the end fitting where they all come tangent to the outer surface of the cylindrical portion 5 of that fitting.

The girth windings as shown are of no greater helix angle than that required to lay them side by side circumferentially of the body of the vessel. Also, the number of them is kept to the minimum for strength requirements, since the uses to which pressure vessels in accordance with the invention are put call for keeping down the weight as much as possible consonant with adequate strength.

Though the helical winding for the vessel of the invention has been shown as following a single cycle pattern, it is, of course, to be understood that this is merely for illustrative purposes. Patterns of two or more cycles, each commencing at circumferentially spaced positions, as more fully described in my application Serial Number 374,600, can be employed with equal facility.

Though the neck 5 of the end fitting has merely been shown with a plain opening therethrough, it is to be understood that this is merely for illustrative purposes and that any suitable thread or other engaging formation can be imparted to this opening if desired.

Insofar as the structure of the vessel is concerned it has already been noted that besides being formed for resistance to internal pressure, vessels in accordance with the invention can be formed with end shapes generated to withstand axial external end loads.

As to possible shapes of vessels made in accordance with the invention they can vary from a long cylinder to a flattened sphere having no cylindrical joining portion. The latter when the vessel is made of flexible filaments or bands positioned by a flexible binder can serve as complete tire-like wheels for aircraft. Likewise flexible rollers can be made out of long cylindrical vessels.

The specific embodiment of the invention which is a flattened sphere having no cylindrical joining section is shown in FIG. 8. The same reference characters have been used for this figure and have the same meaning as is FIGS. 1, 2, 3, 4 and 7 which depict the embodiment of the invention having the form of a cylinder with ovaloid ends. In addition, a broken line 28 is shown in FIG. 8 to indicate where the enlarged ends of the axially aligned ovaloid elements, 2 and 3, abut each other. The filaments in this embodiment are depicted as having been laid down in the winding process in the form of a flat ribbon-like formation or band.

In the event that a vessel is desired having an openwork pattern in the walls, such can be effected by varying the winding pattern, or patterns, to the desired extent. With regard to any small angle helical winding, instead of repeating a cycle in exact juxtaposed relation as shown at 15 and 20 in FIG. 3, the second and each subsequent cycle will be commenced with its winding in spaced relation to the commencement of the initial or next previous winding as the case may be. Winding in this manner will generate a series of crossovers leaving diamond shaped openings in the vessel wall.

As the ends diminish toward the axis, the winding bands converge and the openings diminish and are eventually eliminated.

Should girth strengthening be desired this can be effected by the application of circular windings around the body passing through the crossover points. This converts the diamond shaped openings into triangular ones and increases the rigidity of the structure.

From the foregoing description of the product and method of the invention it will be clear to those skilled in the art that the practice of the invention lends itself readily to various modifications whether suggested in the foregoing or not. It is, accordingly, to be understood that changes may be made in the disclosed method and modifications may be made in the structures and combinations of the same which embody the invention without departing from the scope of the invention. It is thus intended that all matter contained in the description or shown in the accompanying drawings shall be interpreted as illustrative and not in a limiting sense.

The invention claimed is:

1. The method of forming a hollow vessel with substantially closed ovaloid ends and with a central axis which comprises positioning a pair of flanged end fittings in axial alignment with the bases of their flanges in opposed relation, at the ends of the axis of a mandrel formed with ovaloid ends, commencing a helical winding at a position on the surface of said mandrel and continuing said winding from one to the other of said end fittings with said resultant windings overlying the flanges thereof and overlying the surface of said mandrel, said windings being at an angle to said axis, said ovaloid mandrel ends having a surface shaped substantially the same as the shape of an ovaloid end pattern for a filament wound pressure vessel determined by the following method— the method of determining end patterns of filament wound pressure vessels having a central axis which comprises, establishing the circle of maximum circumference of the end pattern in a plane with said axis passing through the center of said circle and at right angles to said plane, establishing a position on said axis in spaced relation with respect to said plane, which position is approximately the position of the closing end of said end pattern on said axis, establishing a relatively smaller circle than said circle of maximum circumference having its center at about said approximate closing end position and lying in a plane perpendicular to said axis, passing thread under subtsantially uniform tension between said circle of maximum circumference and said relatively smaller circle to form a net-work of thread therebetween, and expanding with uniform pressure said net-work outwardly from the inner side thereof to form an end curvature wherein all the threads are in uniform tension.

2. The method of forming a hollow vessel having substantially closed ovaloid ends and with a central axis which comprises positioning a pair of flanged end fittings in axial alignment with the bases of their flanges in opposed relation, at the ends of the axis of a mandrel formed with ovaloid ends, commencing a helical winding at a position on the surface of said mandrel and continuing said winding from one to the other of said end fittings with said resultant windings overlying the flanges thereof and overlying the surface of said mandrel, each successive winding lying alongside the next previous winding until a complete enclosure is formed, said windings extending at an angle to said axis, said ovaloid mandrel ends having a surface shaped substantially the same as the shape of an ovaloid end pattern for a filament wound pressure vessel determined by the following method— the method of determining end patterns of filament wound pressure vessels having a central axis which comprises, establishing the circle of maximum circumference of the end pattern in a plane with said axis passing through the center of said circle and at right angles to said plane, establishing a position on said axis in spaced relation with respect to said plane, which position is approximately the position of the closing end of said end pattern on said axis, establishing a relatively smaller circle than said circle of maximum circumference having its center at about said approximate closing end position and lying in a plane perpendicular to said axis, passing thread under substantially uniform tension between said circle of maximum circumference and said relatively smaller circle to form a net-work of thread therebetween, and expanding with uniform pressure said net-work outwardly from the inner side thereof to form an end curvature wherein all the threads are in uniform tension.

3. The method of forming a hollow vessel having a cylindrical body and substantially closed ovaloid ends which comprises positioning a pair of flanged end fittings in axial alignment with the bases of their flanges in opposed relation, at the ends of the axis of a mandrel formed with a cylindrical body portion and ovaloid ends, commencing a helical winding at a position on the surface of said mandrel and continuing said winding from one to the other of said end fittings with said resultant windings overlying the flanges thereof and overlying the surface of said mandrel, each successive winding lying alongside the next previous winding until a complete enclosure is formed, said windings extending at an angle to said axis, said ovaloid mandrel ends having a surface shaped substantially the same as the shape of an ovaloid end pattern for a filament wound pressure vessel determined by the following method—the method of determining end patterns of filament wound pressure vessels having a central axis which comprises, establishing the circle of maximum circumference of the end pattern in a plane with said axis passing through the center of said circle and at right angles to said plane, establishing a position on said axis in spaced relation with respect to said plane, which position is approximately the position of the closing end of said end pattern on said axis, establishing a relatively smaller circle than said circle of maximum circumference having its center at about said approximate closing end position and lying in a plane perpendicular to said axis, passing thread under substantially uniform tension between said circle of maximum circumference and said relatively smaller circle to form a net-work of thread therebetween, and expanding with uniform pressure said net-work outwardly from the inner side thereof to form an end curvature wherein all the threads are in uniform tension.

4. The method as in claim 3 and including applying a substantially circular windings to the cylindrical body of said vessel overlying said helically wound enclosure.

5. A filament wound hollow vessel having substantially closed ends comprising, a pair of axially aligned ovaloid elements positioned with their enlarged ends in opposed relation, said elements being formed as integral parts of said vessel, the wall of said vessel including said ovaloid elements being formed substantially of helical filament windings bonded together by a suitable binder, said windings forming a helical pattern and said windings extending at an angle substantially less than a right angle with respect to the axis of alignment of said ovaloid elements and continuing from one of said ovaloid elements to the other and back again, said ovaloid elements having an interior surface shaped substantially the same as the shape of an ovaloid end pattern for a filament wound pressure vessel determined by the following method—the method of determining end patterns of filament wound pressure vessels having a central axis which comprises, establishing the circle of maximum circumference of the end pattern in a plane with said axis passing through the center of said circle and at right angles to said plane, establishing a position on said axis in spaced relation with respect to said plane, which position is approximately the position of the closing end of said end pattern on said axis, establishing a relatively smaller circle than said circle of maximum circumference having its center at about said approximate closing end position and lying in a plane perpendicular to said axis, passing thread under substantially uniform tension between said circle of maximum circumference and said relatively smaller circle to form a net-work of thread therebetween, and expanding with uniform pressure said net-work outwardly from the inner side thereof to form an end curvature wherein all the threads are in uniform tension.

6. A hollow vessel as in claim 5 wherein said helical windings of said pattern are reversed at the ends of said vessel at positions closely adjacent the axis thereof.

7. A hollow vessel as in claim 5 wherein a flanged end fitting provided with a cylindrical neck is positioned at each end of said vessel coaxially with the axis of said vessel and said windings overly the flange of said fitting and extend tangentially with respect to the neck thereof.

8. A hollow vessel as in claim 5 and said wall comprising a plurality of layers of said filament windings, each of said layers being formed of filament windings having a single cycle pattern.

9. A hollow vessel as in claim 5 and said wall comprising a plurality of layers of filament windings, each of said layers being of filament windings having a multiple cycle pattern with the various windings of the basic pattern commencing at circumferentially spaced positions with respect to a circle of the wall of said vessel.

10. A hollow vessel as in claim 5 wherein said wall is formed of resilient yieldable material.

11. A hollow vessel as in claim 5 wherein said wall is formed of individual filaments which are extensibly rigid and laterally flexible and wherein said wall is capable of withstanding an external end load as well as internal pressure.

12. A hollow vessel as in claim 5 wherein said windings are formed of a band made up of a plurality of filaments laid side by side.

13. A hollow vessel formed with substantially closed ends which comprises, a pair of axially aligned ovaloid elements positioned with their enlarged ends in opposed relation and a cylindrical joining section extending between said enlarged ends of said ovaloid elements and joining the same together, the wall of said vessel including said ovaloid elements comprising a plurality of continuous filament helical windings extending substantially longitudinally of said vessel at an angle substantially less than a right angle with respect to the axis thereof and continuing from one of said ovaloid elements to the other and back again, said helical windings being bonded together with a suitable binder, the curvature of the enlarged ends of said ovaloid elements being tangent to said cylindrical portion where said ends and said portion are joined together, said ovaloid elements having an interior surface shaped substantially the same as the shape of an ovaloid end pattern for a filament wound pressure vessel determined by the following method—the method of determining end patterns of filament wound pressure vessels having a central axis which comprises establishing the circle of maximum circumference of the end pattern in a plane with said axis passing through the center of said circle and at right angles to said plane, establishing a position on said axis in spaced relation with respect to said plane, which position is approximately the position of the closing end of said end pattern on said axis, establishing a relatively smaller circle than said circle of maximum circumference having its center at about said approximate closing end position and lying in a plane perpendicular to said axis, passing thread under substantially uniform tension between said circle of maximum circumference and said relatively smaller circle to form a net-work of thread therebetween, and expanding with uniform pressure said net-work outwardly from the inner side thereof to form an end curvature wherein all the threads are in uniform tension.

14. A hollow vessel as in claim 13 and said cylindrical portion additionally including substantial circumferential windings at a small angle with respect to a plane normal to the axis of the vessel.

15. A hollow vessel as in claim 13 and said cylindrical joining portion including alternate layers of helical windings and substantially circumferential windings.

16. A filament wound hollow vessel having substantially closed ends comprising, a pair of axially aligned ovaloid elements positioned with their enlarged ends in opposed relation, said elements being formed as integral parts of said vessel, the wall of said vessel including said ovaloid elements being formed substantially of helical filament windings bonded together by a suitable binder, said windings forming a helical pattern and said windings extending at an angle substantially less than a right angle with respect to the axis of alignment of said ovaloid elements and continuing from one of said ovaloid elements to the other and back again, said ovaloid elements having an interior surface shaped substantially the same as the shape of an ovaloid end pattern for a filament wound pressure vessel determined by the following method—the method of determining end patterns of filament wound pressure vessels having a central axis which comprises, establishing the circle of maximum circumference of the end pattern in a plane with said axis passing through the center of said circle and at right angles to said plane, establishing a position on said axis in spaced relation with respect to said plane, which position is approximately the position of the closing end of said end pattern on said axis, seating in upright position with respect to said plane a fitting having a cylindrical neck and a flanged base, said fitting being seated coaxially with said central axis and having its flanged base substantially at said approximate closing end position, passing threads from positions on said circle across said flanged base tangent to said cylindrical neck to form a network of threads therebetween, securing said threads at said circle, removing the support for said fitting, and expanding with uniform pressure said network outwardly from the inner side thereof to form an end curvature wherein all the threads are in uniform tension.

17. A filament wound hollow vessel having substantially closed ends comprising, a pair of axially aligned ovaloid elements positioned with their enlarged ends in opposed relation, said elements being formed as integral parts of said vessel, the wall of said vessel including said ovaloid elements being formed substantially of helical filament windings bonded together by a suitable binder, said windings forming a helical pattern and said windings extending at an angle substantially less than a right angle with respect to the axis of alignment of said ovaloid elements and continuing from one of said ovaloid elements to the other and back again, said ovaloid elements having an interior surface shaped substantially the same as the shape of an ovaloid end pattern for a filament wound pressure vessel determined by the following method—the method of determining end patterns of filament wound pressure vessels having a central axis which comprises, establishing the circle of maximum circumference of the end pattern in a plane with said axis passing through the center of said circle and at right angles to said plane, establishing a position on said axis in spaced relation with respect to said plane, which position is approximately the position of the closing end of said end pattern on said axis, establishing a relatively smaller circle than said circle of maximum circumference having its center at about said approximate closing end position and lying in a plane perpendicular to said axis, passing thread under relatively uniform tension between said circle of maximum circumference and said relatively smaller circle to form a network of threads therebetween, expanding with uniform pressure said network outwardly from the inner side thereof to form an end curvature wherein all the threads are in uniform tension, and adjusting the resulting structure until the curves defined by axially sectioning the end curvature so formed have terminal slopes which bring them tangent to a simulated cylinder formed by moving said circle of maximum circumference along said central axis.

18. A filament wound hollow vessel having substantially closed ends comprising a pair of substantially identical, axially aligned ovaloid elements positioned with their enlarged ends in opposed and abutting relation, said ovaloid elements containing coaxial end fittings having a cylindrical neck, said ovaloid elements being formed as integral parts of said vessel, the wall of said vessel including said ovaloid elements being formed substantially of filament windings bonded together by a suitable binder, said windings extending at an angle substantially less than a right angle with respect to the axis of alignment of said ovaloid elements and continuing from a position substantially tangent to the neck of one of said ovaloid elements across the abutting ends of the ovaloid elements to a position substantially tangent to the neck of the other of said ovaloid elements and back again, said ovaloid elements having an interior surface shaped substantially the same as the shape of an ovaloid end pattern for a filament wound pressure vessel determined by the following method: the method of determining end patterns of filament wound pressure vessels having a central axis which comprises, establishing the circle of maximum circumference of the end pattern in a plane with said axis passing through the center of said circle and at right angles to said plane, establishing a position on said axis in spaced relation with respect to said plane, which position is approximately the position of the closing end of said end pattern on said axis, establishing a relatively smaller circle than said circle of maximum circumference having its center at about said approximate closing end position and lying in a plane perpendicular to said axis, passing thread under substantially uniform tension between said circle of maximum circumference and said relatively smaller circle to form a net-work of thread therebetween, and expanding with uniform pressure said net-work outwardly from the inner side thereof to form an end curvature wherein all the threads are in uniform tension.

References Cited in the file of this patent

UNITED STATES PATENTS

| | | |
|---|---|---|
| 1,011,090 | Subers | Dec. 5, 1911 |
| 1,651,521 | Girardville | Dec. 6, 1927 |
| 2,109,529 | Goddard | Mar. 1, 1938 |
| 2,143,852 | Anderson | Jan. 17, 1939 |
| 2,556,590 | Long | June 12, 1951 |
| 2,739,734 | Pugh | Mar. 27, 1956 |
| 2,744,043 | Ramberg | May 1, 1956 |
| 2,848,133 | Ramberg | Aug. 19, 1958 |

FOREIGN PATENTS

| | | |
|---|---|---|
| 775,577 | Great Britain | May 29, 1957 |
| 1,068,933 | France | Feb. 10, 1954 |